(12) United States Patent
Meggiolan et al.

(10) Patent No.: US 8,590,421 B2
(45) Date of Patent: Nov. 26, 2013

(54) BICYCLE BOTTOM BRACKET ASSEMBLY AND ADAPTER DEVICE FOR SUCH AN ASSEMBLY

(75) Inventors: Mario Meggiolan, Creazzo (IT); Paolo Pasqua, Camisano Vicentino (IT)

(73) Assignee: Campagnolo S.r.l., Vicenza (IT)

( * ) Notice: Subject to any disclaimer, the term of this patent is extended or adjusted under 35 U.S.C. 154(b) by 1205 days.

(21) Appl. No.: 11/713,329

(22) Filed: Mar. 2, 2007

(65) Prior Publication Data

US 2007/0207631 A1    Sep. 6, 2007

(30) Foreign Application Priority Data

Mar. 3, 2006  (EP) ..................................... 06425146

(51) Int. Cl.
*B62M 3/00*    (2006.01)
(52) U.S. Cl.
USPC ........................... 74/594.1; 384/458; 384/545
(58) Field of Classification Search
USPC ........... 74/594.1, 594.4, 594.2; 384/458, 545, 384/510, 539, 903
See application file for complete search history.

(56) References Cited

U.S. PATENT DOCUMENTS

| 529,110 | A | 11/1894 | Copeland |
| 535,706 | A | 3/1895 | Luther |
| 590,695 | A | 9/1897 | Alcorn |
| 593,562 | A | 11/1897 | Brennan |
| 594,109 | A | 11/1897 | Weed et al. |
| 596,846 | A | 1/1898 | Brown |
| 602,049 | A | 4/1898 | Beard |
| 648,077 | A | 4/1900 | Ludlow |
| 658,624 | A | 9/1900 | Egger |
| 846,239 | A | 3/1907 | Osborne |
| 951,137 | A | 3/1910 | Lowrance |
| 1,235,530 | A * | 7/1917 | Jones ............................ 384/458 |
| 1,449,235 | A * | 3/1923 | Lewis ........................... 384/458 |

(Continued)

FOREIGN PATENT DOCUMENTS

| CN | 1522929 | 8/2004 |
| DE | 012 57 613 | 12/1967 |

(Continued)

OTHER PUBLICATIONS

English translation of Oct. 27, 2010 Office Action issued in corresponding Chinese Appln. No. 200710085427.6.

(Continued)

*Primary Examiner* — Thomas Diaz
(74) *Attorney, Agent, or Firm* — Volpe and Koenig, P.C.

(57) ABSTRACT

A bicycle bottom bracket assembly has a shaft having a longitudinal axis X-X, a pair of bearings configured to support the shaft in rotation with respect to a housing box of the bottom bracket assembly provided in a bicycle frame, and a pair of adapter devices configured to be cantilevered with opposite free ends of the box to support the bearings outside of said box. At least one of the adapter devices has at least one first stop element and at least one second stop element arranged on opposite sides with respect to at least one bearing, wherein the first and second stop elements cooperate with the at least one bearing to keep the at least one bearing inside a space having a predetermined axial extension. The bearing's movement is thus limited in the axial direction, providing a fixed reference to determine the chain line of the bottom bracket assembly.

45 Claims, 12 Drawing Sheets

(56) References Cited

U.S. PATENT DOCUMENTS

| | | |
|---|---|---|
| 2,136,125 A * | 11/1938 | Delaval-Crow ............... 384/539 |
| 3,306,101 A | 2/1967 | Holderer |
| 3,347,112 A | 10/1967 | Thun |
| 3,578,829 A * | 5/1971 | Hata et al. ..................... 384/458 |
| 3,888,136 A | 6/1975 | Lapeyre |
| 3,906,811 A | 9/1975 | Thun |
| 4,093,325 A | 6/1978 | Troccaz |
| 4,208,763 A | 6/1980 | Schroder |
| 4,300,411 A | 11/1981 | Segawa |
| 4,331,043 A | 5/1982 | Shimano |
| 4,406,504 A | 9/1983 | Coenen et al. |
| 4,704,919 A | 11/1987 | Durham |
| 4,810,040 A | 3/1989 | Chi |
| 5,067,370 A | 11/1991 | Lemmens |
| 5,243,879 A | 9/1993 | Nagano |
| 5,493,937 A | 2/1996 | Edwards |
| 5,624,519 A | 4/1997 | Nelson et al. |
| 5,819,600 A | 10/1998 | Yamanaka |
| 5,907,980 A | 6/1999 | Yamanaka |
| 5,984,528 A | 11/1999 | Ohtsu |
| 5,997,022 A | 12/1999 | Matsui |
| 6,014,913 A | 1/2000 | Masahiro |
| 6,116,114 A | 9/2000 | Edwards |
| 6,192,300 B1 | 2/2001 | Watarai et al. |
| 6,443,033 B1 | 9/2002 | Brummer et al. |
| 6,564,675 B1 | 5/2003 | Jiang |
| 6,581,494 B2 | 6/2003 | Sechler |
| 6,790,535 B2 | 9/2004 | Nishimura et al. |
| 6,829,965 B1 | 12/2004 | Mombrinie |
| 6,886,676 B2 | 5/2005 | Von Levern et al. |
| 6,938,516 B2 | 9/2005 | Yamanaka |
| 6,983,672 B2 * | 1/2006 | Smith ........................... 74/594.1 |
| 6,988,427 B2 * | 1/2006 | Yamanaka ................... 74/594.1 |
| 7,258,041 B2 | 8/2007 | Yamanaka et al. |
| 7,264,256 B2 | 9/2007 | Fujii |
| 7,267,030 B2 | 9/2007 | French |
| 7,503,239 B2 | 3/2009 | Yamanaka |
| 7,798,724 B2 | 9/2010 | Van De Sanden et al. |
| 2001/0015390 A1 | 8/2001 | Hitomi et al. |
| 2002/0081052 A1 | 6/2002 | Chi |
| 2002/0096015 A1 | 7/2002 | Smith |
| 2003/0006113 A1 | 1/2003 | Terada et al. |
| 2003/0097901 A1 * | 5/2003 | Yamanaka ................... 74/594.1 |
| 2004/0162172 A1 | 8/2004 | Yamanaka et al. |
| 2005/0011304 A1 | 1/2005 | Chiang |
| 2005/0016323 A1 | 1/2005 | Dal Pra' |
| 2005/0040699 A1 | 2/2005 | Chiang et al. |
| 2005/0081678 A1 | 4/2005 | Smith et al. |
| 2005/0217417 A1 | 10/2005 | Uchida et al. |
| 2006/0103106 A1 | 5/2006 | Schlanger |
| 2006/0112780 A1 | 6/2006 | Shiraishi et al. |
| 2006/0288819 A1 | 12/2006 | Dal Pra' et al. |
| 2007/0137426 A1 | 6/2007 | Meggiolan et al. |
| 2007/0151410 A1 | 7/2007 | Meggiolan |
| 2007/0204722 A1 | 9/2007 | Dal Pra' |
| 2007/0207631 A1 | 9/2007 | Meggiolan et al. |
| 2007/0283781 A1 | 12/2007 | Meggiolan |
| 2008/0124018 A1 | 5/2008 | Tanke et al. |
| 2009/0145262 A1 | 6/2009 | Pasqua et al. |
| 2009/0261553 A1 | 10/2009 | Meggiolan |
| 2011/0049834 A1 | 3/2011 | Natu |

FOREIGN PATENT DOCUMENTS

| | | |
|---|---|---|
| DE | 023 59 437 | 6/1975 |
| DE | 297 15 373 U1 | 8/1998 |
| DE | 200 03 398 | 5/2000 |
| DE | 20003398 U1 | 5/2000 |
| EP | 0 756 991 A2 | 8/1996 |
| EP | 0 924 318 | 6/1999 |
| EP | 1 120 336 | 8/2001 |
| EP | 1 314 902 | 5/2003 |
| EP | 1 342 656 A2 | 9/2003 |
| EP | 1 342 656 A3 | 9/2003 |
| EP | 1 449 760 A2 | 8/2004 |
| EP | 1 659 057 | 5/2006 |
| EP | 1 661 803 | 5/2006 |
| EP | 1 726 517 | 11/2006 |
| EP | 1 726 518 | 11/2006 |
| EP | 1 759 981 A2 | 3/2007 |
| EP | 1 759 981 A3 | 3/2007 |
| EP | 1 792 818 | 6/2007 |
| EP | 1 792 821 | 6/2007 |
| EP | 1 820 726 | 8/2007 |
| FR | 0 623 094 | 6/1927 |
| FR | 623094 | 6/1927 |
| FR | 0 863 610 | 4/1941 |
| FR | 0 934 104 | 5/1948 |
| FR | 2 801 863 | 6/2001 |
| FR | 2 870 508 | 11/2005 |
| GB | 2315776 | 2/1998 |
| JP | 57-128585 | 8/1982 |
| JP | 05319349 | 12/1993 |
| JP | 09104383 | 4/1997 |
| JP | 11225633 | 8/1999 |
| JP | 2000-289677 | 10/2000 |
| JP | 2003-261087 | 9/2003 |
| JP | 2004-106838 | 4/2004 |
| JP | 2004-249770 | 9/2004 |
| JP | 2004-275193 | 10/2004 |
| JP | 2005-001663 | 1/2005 |
| JP | 2005-053410 | 3/2005 |
| TW | 363030 B | 7/1999 |
| TW | 442422 B | 6/2001 |
| TW | 567160 B | 12/2003 |
| WO | 01/63134 | 8/2001 |
| WO | 02/32751 A2 | 4/2002 |
| WO | 2005-009832 | 2/2005 |
| WO | 2005/058682 | 6/2005 |

OTHER PUBLICATIONS

"A Folding MWB Two-Wheeled Recumbent", Nick Abercrombie Andrews. Human Power, spring-summer 1994, 11(2), pp. 18-21. http://web.archive.org/web/20050210021901/http://pardo.net/bike/pic/fail-005/000.html.

English translation of Oct. 27, 2010 Office Action issued in corresponding Chinese Appln. No. 20070085427.6.

European Search Report (EP08425259), Oct. 21, 2008.

Isis Drive Standard Committee, (Copyright 2001), *The International Spline Interface Standard*, (18 pgs.).

Oct. 25, 2011 Office Action issued in Japanese Appln. No. 2006-326959.

English translation of Oct. 25, 2011 Office Action issued in Japanese Appln. No. 2006-326959.

Japanese Office Action and English translation for Application No. 2007-118028—Issued on Feb. 28, 2012.

Japanese Office Action and English translation for Application No. 2007-037411—Issued on Feb. 28, 2012.

English translation of Taiwanese Office Action and Search Report dated Jan. 28, 2013.

* cited by examiner

BICYCLE BOTTOM BRACKET ASSEMBLY AND ADAPTER DEVICE FOR SUCH AN ASSEMBLY

FIELD OF INVENTION

The present invention relates to a bicycle bottom bracket assembly. The invention also relates to an adapter device for such an assembly and to a method for mounting a bearing of such an assembly with respect to a housing box of the assembly provided in a bicycle frame.

BACKGROUND

As known, a bicycle bottom bracket assembly comprises a shaft rotatably supported in a housing box provided in the bicycle frame and two crank arms associated with the opposite ends of the shaft. The shaft can be made in a distinct piece from the crank arms or can be made in a single piece with one of the two crank arms.

The rotation of the shaft with respect to the box is achieved through the use of a pair of rolling bearings mounted on the shaft. Specifically, each bearing is positioned on the shaft at a respective body portion of the shaft adjacent to the crank arm.

Typically, the bearings are supported inside or outside the box provided in the bicycle frame by suitable adapters mounted at the opposite free ends of such a box.

It is known that the precision of gearshifting is greatly influenced by the distance between the middle plane of the frame and the middle plane of the crankset, also known as the chain line.

In the known assembly great attention is put on the chain line at the design stage and assembly stage.

However, the Applicant has found that often, in currently known assemblies, the shifting of the gear engaged with the chain is not very precise.

SUMMARY

The present invention relates, in a first aspect thereof, to a bicycle bottom bracket assembly, comprising:
a shaft having a longitudinal axis X-X extending along a predetermined direction;
a pair of bearings configured to rotatably support said shaft with respect to a housing box of the bottom bracket assembly provided in a bicycle frame;
a pair of adapter devices coupled with said bearings and configured to be associated with opposite free ends of said box to support said bearings with respect to said box;
wherein at least one adapter device of said pair of adapter devices comprises at least one first stop element and at least one second stop element arranged on opposite sides with respect to at least one bearing, wherein said at least one first stop element and at least one second stop element cooperate with said at least one bearing to keep said at least one bearing inside a space having a predetermined axial extension.

BRIEF DESCRIPTION OF THE DRAWINGS

Further characteristics and advantages shall become clearer from the following detailed description of some preferred embodiments thereof, made with reference to the attached drawings. In such drawings.

DETAILED DESCRIPTION OF THE PREFERRED EMBODIMENTS

Introduction

Figure 1:
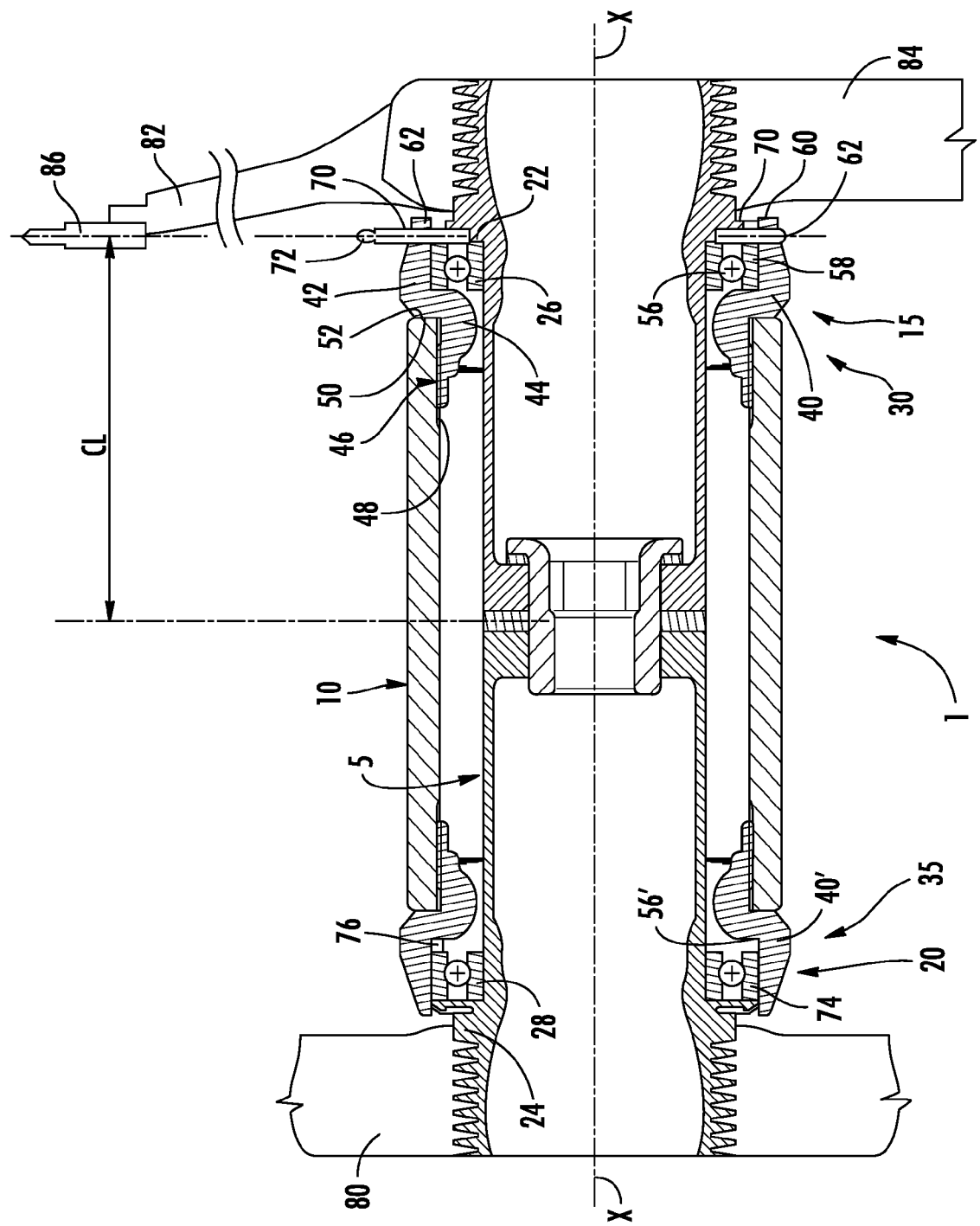
FIG. 1 is a schematic longitudinal sectional view of a first embodiment of a bicycle bottom bracket assembly in accordance with the present invention.

Advantageously, in the bottom bracket assembly, the aforementioned stop elements ensure that at least one of the two bearings of the assembly (in particular, the right bearing) is kept inside a space having an axial extension which is predetermined so that the chain line remains substantially unvaried during pedaling even in the case of sizing errors of the box of the frame or of other components of the bottom bracket assembly. In this way the chain line is thus prevented from being modified during pedaling by means of the thrust exerted by the chain on the wheels of the crankset, thus ensuring the desired precision of the gearshifting.

Even more advantageously, the presence of the stop elements at the opposite sides of the bearing allows such a bearing to absorb lateral knocks in both axial directions, thus ensuring that the correct position of the shaft with respect to the box of the frame is maintained even in the presence of such lateral knocks.

The adapter devices can be associated cantilevered with the opposite ends of said box to support said bearings outside of said box or they can be housed inside said box to support said bearings inside said box.

In a first embodiment of the bottom bracket assembly, said space has an axial extension equal to the axial extension of said at least one bearing. In this embodiment, therefore, the bearing is blocked between the aforementioned stop elements and any possible relative movement thereof with respect to the adapter device in both ways of the axial direction is prevented. Preferably, in this embodiment an axial movement between the other bearing and the shaft or the respective adapter device is permitted to allow the recovery of sizing errors of the box of the bicycle frame without varying the positioning of the shaft with respect to the box and, therefore, without altering the determination of the chain line.

In a preferred embodiment of the bottom bracket assembly, said space has an axial extension greater than the axial extension of said at least one bearing by a value of between 0 and 0.3 mm, preferably between 0.05 and 0.15 mm. In this embodiment, therefore, a limited axial movement is foreseen between bearing and respective adapter device, after which when the bearing goes into abutment against the stop element any possible further axial movement is prevented. Such limited movement is however such as not to cause a significant variation of the chain line and therefore does not negatively influence the precision of the gearshifting.

Advantageously, the possibility of axial movement between bearing and adapter device allows small sizing errors of the box of the frame to be recovered, either by excess or by defect, without this influencing the position of the shaft and therefore the chain line. Such a provision thus makes the chain line at least partially independent from the sizing errors of the box of the frame.

Preferably, said at least one first stop element and at least one second stop element act on an outer ring of said at least one bearing. Nevertheless, it is contemplated the possibility that said at least one first stop element and at least one second stop element act on an inner ring of said at least one bearing, for example in cases in which the bearing is housed in a seat formed in the body of the crank arm, as described in U.S. patent application Ser. No. 11/607,688 filed Dec. 1, 2006 to the same Applicant.

In a specific embodiment of the bottom bracket assembly, said at least one adapter device comprises a main body configured to be associated with one end of said box and said at least one first stop element and at least one second stop element are defined by first shoulders integrally made with said main body. Such an adapter device is advantageously very cost-effective and allows the bearing to be stably incorporated inside it, thus reducing the number of components to be assembled to manufacture the bottom bracket assembly.

Preferably, such a type of adapter device is obtained by forming in the main body of the adapter device a bearing housing seat comprising a first shoulder, inserting the bearing in such a housing seat and deforming a free end of said main body to obtain a second shoulder.

In a particularly preferred embodiment of the bottom bracket assembly, said at least one adapter device comprises a main body configured to be associated with one end of said box, said at least one first stop element is defined by a shoulder made in a single piece with said main body and said at least one second stop element is associated with said main body at an axially outer free end portion thereof.

Preferably, said at least one second stop element is removably associated with said main body. Advantageously, such a type of adapter device allows the bearing to be mounted and dismounted in and from the main body of the adapter device, for example to allow the replacement or the maintenance of the bearing.

Preferably, said main body comprises, at said axially outer free end portion, an annular body portion comprising at least one through hole extending radially. As described hereinafter, such a through hole allows the passage of a free end portion of the at least one second stop element so that this free end portion can block or limit the relative axial movement between bearing and main body of the adapter device.

More preferably, said at least one through hole is at an axial distance from said at least one first stop element greater than the axial extension of said at least one bearing by a value of between 0 and 0.3 mm.

Even more preferably, said at least one through hole is formed in an annular throat made on an outer surface of said annular body portion of said main body.

In a preferred embodiment of the bottom bracket assembly a plurality of through holes are provided, preferably even in number, more preferably 2 or 4 through holes. Advantageously, the arrangement of many holes allows the simultaneous use of a plurality of second stop elements, so as to improve the efficiency of the blocking or limiting action of the relative axial movement between bearing and main body of the adapter device exerted by such second stop elements.

Preferably, said radial through holes are arranged in radially opposite positions. As shall become clearer throughout the present description, such an arrangement ensures greater efficiency of the blocking or limiting action of the relative axial movement between bearing and main body of the adapter device.

Preferably, said at least one second stop element is housed in said at least one annular throat and comprises at least one end portion projecting from said at least one through hole. Advantageously, the arrangement of the aforementioned through holes at the aforementioned axial distance that is greater than the axial extension of the bearing makes it possible to avoid the end portion of the second stop element from being able to slide or bang against the ring of the bearing when the second stop element is inserted in the through hole. On the other hand, as already stated, the aforementioned clearance between bearing and the second stop element is such as not to substantially vary the chain line of the bottom bracket assembly, thus ensuring the desired precision of the gearshifting.

Advantageously, the housing of the second stop element in the annular throat ensures a stable positioning of such a stop element with respect to the main body of the adapter device.

More preferably, said at least one second stop element is made from an elastic material and comprises a substantially circular central body portion having a bending radius less than or equal to the bending radius of said annular throat. Advantageously, the second stop element elastically deforms when inserted in the annular throat of the main body of the adapter device, thus achieving a greater stability of the housing of the second stop element in the aforementioned throat.

In an alternative embodiment of the assembly said at least one through hole is a threaded hole and said at least one second stop element comprises at least one screw housed in said at least one threaded hole and having a free end projecting from said at least one threaded hole. In this case, preferably, to improve the efficiency of the blocking or limiting action of the relative axial movement between bearing and main body of the adapter device, a plurality of screws are used, each one screwed into a respective threaded hole.

In a further alternative embodiment of the assembly said at least one second stop element is permanently associated with said main body and is selectively mobile between a disengagement position in which said at least one second stop element does not project from said main body and an engagement position in which said at least one second stop element projects at least partially from said main body. Also in this case, advantageously, an adapter device is made that allows the mounting and dismounting of the bearing in and from the main body of the adapter device, for example to allow the replacement or maintenance of the bearing.

In the specific case of this last embodiment, preferably, the bottom bracket assembly comprises a control element selectively mobile between a first operative position in which said at least one second stop element is in said disengagement position and a second operative position in which said at least one second stop element is in said engagement position.

Preferably, said control element comprises a ring rotatably mounted on said axially outer annular end portion of said main body.

Preferably, said at least one second stop element comprises at least one pawl having a head rotatably housed in a recess formed on an inner surface of said ring and a body housed in a through opening formed in said annular end portion of said main body, said body having a free end that, when said ring is in said first operative position, projects from said through opening and when said ring is in said second operative position is housed in said through opening.

Preferably, said through opening comprises a side surface that is inclined with respect to a radial direction and configured to thrust said pawl from said engagement position to said disengagement position when said ring is moved from said second operative position to said first operative position.

Preferably, in this case the assembly comprises elastic means acting between said ring and said annular end portion of said main body to thrust said at least one second stop element in said engagement position. Advantageously, the second stop element is normally in the operative position configured to block or limit the relative axial movement between bearing and main body of the adapter device and is only brought to the disengagement position when the bearing has to be dismounted from or mounted into the aforementioned main body.

Preferably, said elastic means comprise at least one compression spring acting between a first thrusting surface defined in a first seat formed in said inner surface of said ring and a second thrusting surface defined in a second seat formed on an outer surface of said annular end portion of said main body.

Preferably, said control element comprises an outer surface having a grooved profile, configured to allow an easier actuation of the control element through a maneuvering key.

More preferably, said main body comprises an axially inner body portion adjacent to said axially outer annular end portion and having an outer surface having a grooved profile identical to the grooved profile of said control element. In this way it is possible to use the same maneuvering key both to screw the main body of the adapter device into the box and to actuate the control element. Moreover, the provision of a grooved profile on the main body of the adapter device allows a better grasping of such an element to keep it still during the actuation of the control element.

Irrespective of the specific embodiment of the assembly, preferably the other bearing of said pair of bearings is left free to move with respect to at least one from the respective adapter device and said shaft in at least one way of said predetermined direction. Advantageously, the possibility of having a relative axial movement between the other bearing and the respective adapter device or the shaft allows sizing errors of the box of the frame to be recovered, without influencing the position of the shaft and therefore the determination of the chain line.

Preferably, said bearing is left free to move in both ways of said predetermined direction to allow the recovery of sizing errors of the box, either in excess or in defect.

Preferably, at least one from said adapter device and said shaft comprises at least one second shoulder and a preloaded elastic element arranged between said bearing and said at least one second shoulder. Advantageously, thanks to the presence of the preloaded elastic element it is possible to allow the relative movement between bearing and adapter or shaft to recover the sizing errors of the box at the same time maintaining a preloaded thrust on the bearing that is not cancelled out by the movement of the bearing itself. The preloading indeed allows a thrust to be exerted on the bearing not only in the case of movement of the adapter or of the bearing towards the outside of the box to recover an error due to an excessive axial sizing of the box, but also in the case of movement of the adapter or of the bearing towards the inside of the box to recover errors in defect in the axial sizing of the box. In any case a more stable positioning of the bearing is achieved.

In a first preferred embodiment of the bottom bracket assembly, said at least one second shoulder is defined in a first adapter device and the other adapter device comprises said at least one first stop element and at least one second stop element.

In a second preferred embodiment of the bottom bracket assembly, said second shoulder is defined in said shaft and both of the adapter devices comprise said at least one first stop element and at least one second stop element. Advantageously, such an assembly is very strong since possible overloading caused by lateral knocks is shared out over both bearings. Even more advantageously, in such an assembly the bearings are closer to the crank arms; this allows the bending stress to which the shaft is subjected during pedaling to be reduced.

In a third preferred embodiment of the bottom bracket assembly, both of the adapter devices comprise said at least one first stop element and at least one second stop element and a preloaded elastic element is arranged between said at least one first stop element and at least one second stop element of at least one adapter device.

Preferably, said elastic element comprises a washer having an undulating lateral profile.

Preferably, the bottom bracket assembly, irrespective of its specific embodiment, also comprises a third stop element fixedly connected to said shaft on the opposite side to said at least one second stop element with respect to said at least one bearing. Advantageously, such a third stop element allows a relative movement between bearing and shaft to be avoided in the case of a very hard knock that pushes the shaft sideways, which would make the assembly unusable.

Preferably, said third stop element is a ring inserted in a throat made on said shaft.

In a second aspect thereof, the present invention relates to an adapter device for supporting a bearing of a bottom bracket assembly with respect to a housing box of such an assembly provided in a bicycle frame, comprising a main body configured to be associated cantilevered with a free end of said box, at least one first stop element and at least one second stop element facing one another and arranged at a predetermined distance from the first stop element, wherein the first and second stop elements define a range of motion of a bearing along a longitudinal axis of the housing box.

Advantageously, such an adapter device can be used in the bottom bracket assembly and thus allows the advantages mentioned above with reference to the adapter device of the assembly to be achieved.

Preferably, the aforementioned adapter device comprises, individually or in combination, the structural and advantageous features described above as preferred features of the adapter device of the bottom bracket assembly.

In a third aspect thereof, the present invention relates to a method for mounting a bearing of a bottom bracket assembly with respect to a housing box of such an assembly provided in a bicycle frame, comprising the steps of:

providing an adapter device comprising a main body, at least one first stop element and at least one second stop element facing each other and arranged at a predetermined distance;

associating said main body with a free end of said box.

Advantageously, the aforementioned method allows assembling the bottom bracket assembly and thus allows the advantages mentioned above with reference to the assembly to be achieved. Preferably, such an assembly comprises, individually or in combination, the structural and advantageous features described above as preferred features of the bottom bracket assembly.

Description

In FIGS. 1, 10, 11, 12 and 13, a bottom bracket assembly in accordance with the present invention is indicated with 1.

The assembly 1 comprises a shaft 5 rotatably supported inside a box 10 provided in a bicycle frame (not illustrated) through the interposition of a right bearing 15 and of a left bearing 20. Preferably the right bearing 26 is press fitted on the shaft 5. The shaft 5 is coupled, at its respective left and right ends, to a left crank arm 80 and to a right crank arm 84. The right crank arm 84 has a connecting portion 82 to be connected at least to a toothed gear. In the assembled configuration the shaft 5, the right crank arm 84 and the toothed gear 86 are rigidly connected to each other. The distance between the middle plane of the frame of the bicycle and the middle plane of the toothed gear 86 is called chain line (CL in FIG. 1).

In the examples illustrated in FIGS. 1, 10, 11, 12 and 13, the shaft 5 is made in two separate pieces coupled together at their heads, but this should not be considered a limitation, given that the shaft could be made in a single piece.

Figure 11:
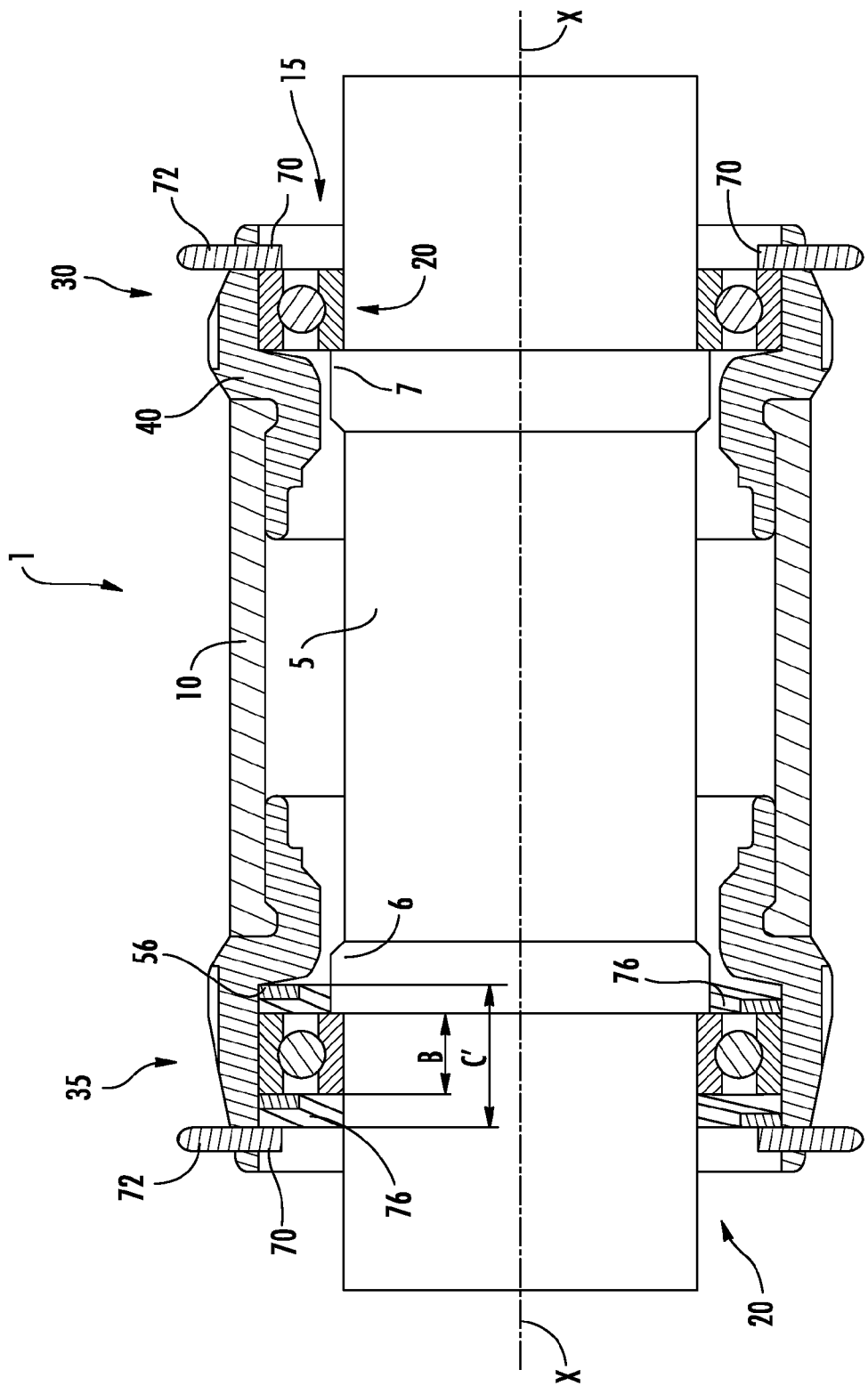
FIG. 11 is a schematic longitudinal sectional view of a further alternative embodiment of a bicycle bottom bracket assembly in accordance with the present invention.
Figure 12:
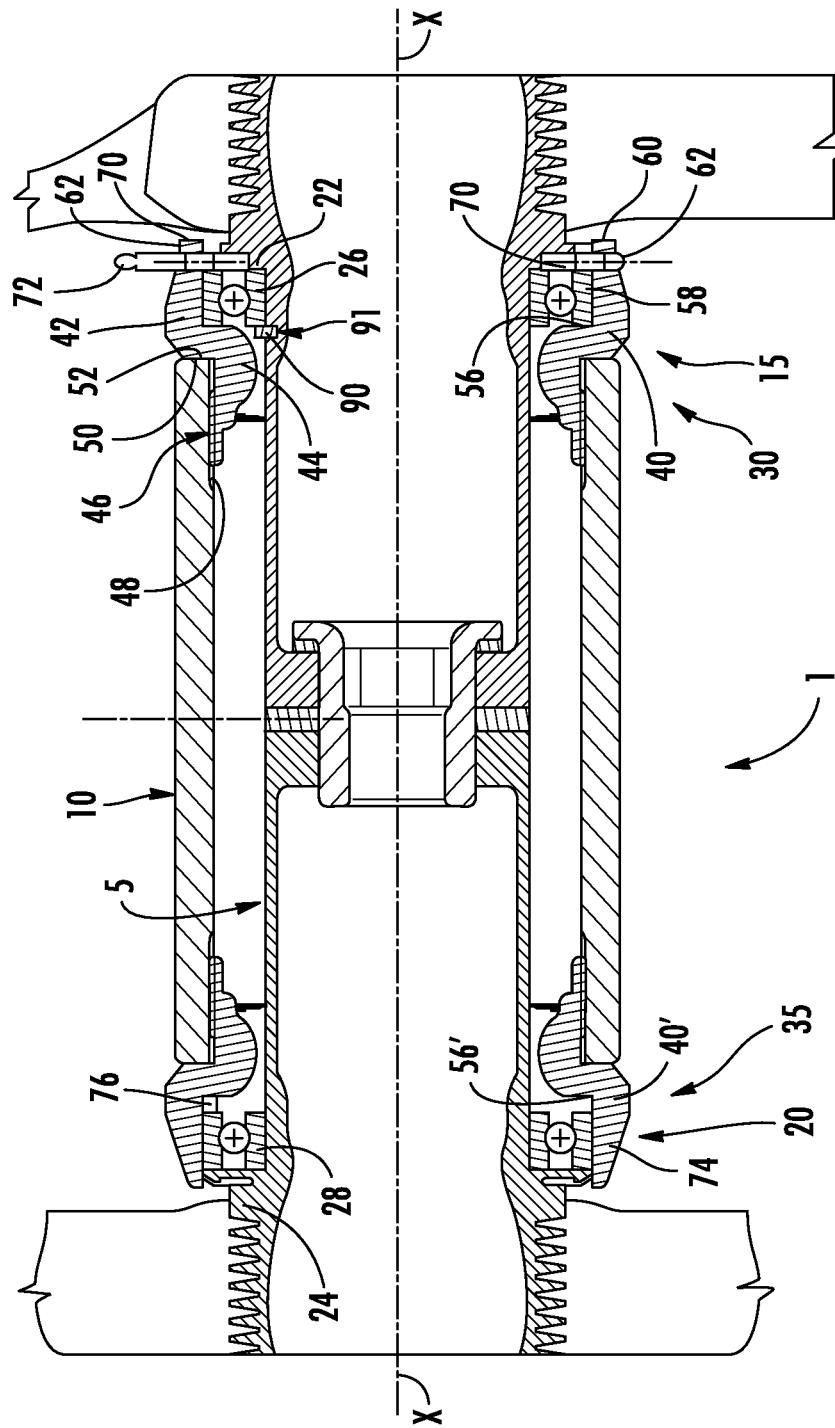
FIG. 12 is a schematic longitudinal sectional view of a further alternative embodiment of a bicycle bottom bracket assembly in accordance with the present invention.
Figure 13:
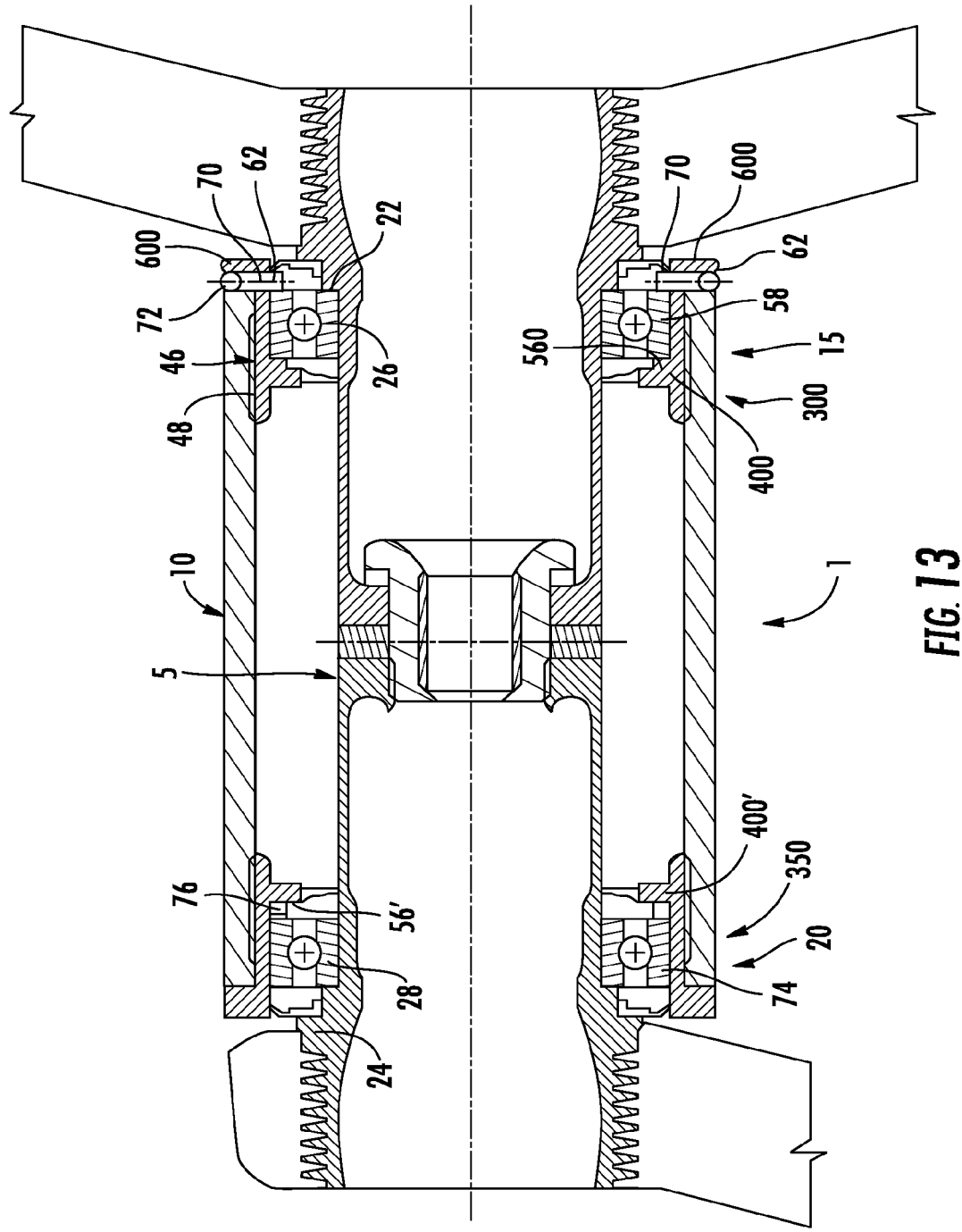
FIG. 13 is a schematic longitudinal sectional view of a further alternative embodiment of a bicycle bottom bracket assembly in accordance with the present invention.

The assemblies 1 of FIGS. 1, 10, 11, 12 and 13 represent alternative embodiments of the assembly. In particular, FIGS. 1, 10, 11 and 12 illustrate assemblies in which the bearings are supported cantilevered outside of the box 10, whereas FIG. 13 illustrates an assembly in which the bearings are supported inside the box 10.

With reference to FIG. 1, the shaft has, at the opposite end portions thereof, a right shoulder 22 and a left shoulder 24 that act in abutment against the inner ring 26 of the right bearing 15 and against the inner ring 28 of the left bearing 20 to prevent the bearings slipping towards the outside of the bottom bracket assembly.

The bearings 15, 20 are coupled with the box 10 through a right adapter device 30 and a left adapter device 35. The adapter devices are preferably made of light material, such as light metal alloy, or of composite material, The composite material can comprise structural fibers incorporated in a polymeric material.

Typically, the structural fibers are chosen from the group comprising carbon fibers, glass fibers, aramidic fibers, ceramic fibers, boron fibers and combinations thereof. Carbon fibers are particularly preferred.

The arrangement of the structural fibers in the polymeric material can be a random arrangement of pieces or small sheets of structural fibers, an ordered substantially unidirectional arrangement of fibers, an ordered substantially two-dimensional arrangement of fibers, or a combination of the above.

Preferably, the polymeric material is thermosetting. However it is possible to use a thermoplastic material.

More preferably, the polymeric material comprises an epoxy resin.

Figure 2:
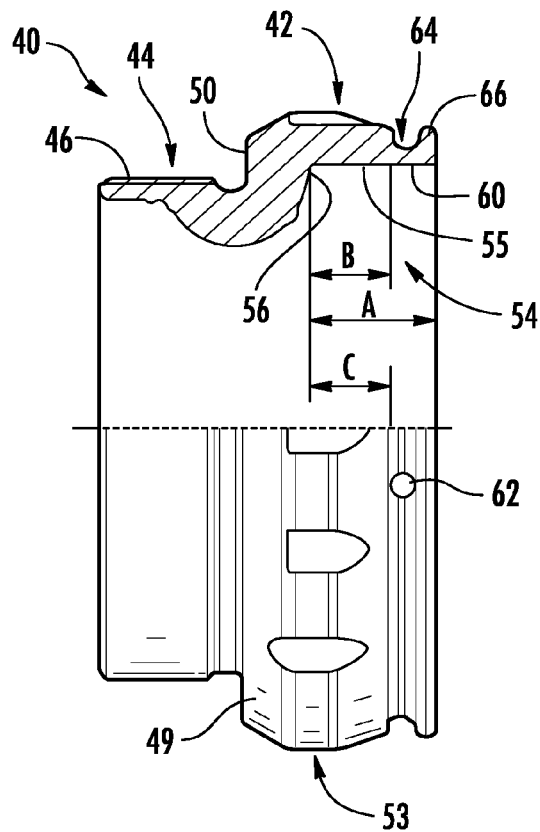
FIG. 2 is a schematic side view partially in section of a main body of the right adapter device of the assembly of FIG. 1.

The right adapter device 30 comprises a main body 40 in turn defined by a first cylindrical portion 42 having a greater diameter and by a second cylindrical portion 44 having a smaller diameter (see also FIG. 2). The portion 42 having a greater diameter is configured to be supported cantilevered outside of the box 10, whereas the portion having a smaller diameter 44 has an outer threading 46 configured to screw into a threading 48 inside the box 10. The bearing 15 is housed in the cylindrical portion 42 having a greater diameter.

The portion having a greater diameter 42 is defined, on the side where it joins to the portion having a smaller diameter 44, by an outer annular surface 50, and has a grooved profile 53 (FIG. 2) on the outer surface 49 of an end portion thereof to allow engagement with a maneuvering key.

The adapter device 30 is screwed into the box 10 acting with the maneuvering key until the annular surface 50 abuts against the front surface 52 of the front end of the box 10.

The portion having a greater diameter 42 has an inner hole 54 (FIG. 2) that defines a seat in which the right bearing 15 is housed. In particular, the diameter of the cylindrical surface 55 of the hole 54 substantially coincides with the outer diameter of the bearing 15, whereas the bottom surface 56 of the hole 54, in an assembled condition, defines a shoulder having the function of a first stop element for the outer ring 58 of the bearing 15, said shoulder being configured to prevent the axial translation of the bearing towards the inside of the assembly 1.

The cylindrical surface 55 has an axial extension A greater than the axial extension B of the outer ring 58 of the bearing 15 (FIG. 2), for which reason when the latter is inserted therein a free end portion 60 remains.

At such a free portion 60 of the cylindrical surface 55 one or more through holes 62 are formed extending radially that open out into an annular throat 64 formed on the outer surface 66 of the portion having a greater diameter 42 of the main body 40 of the adapter device 30. Preferably, the holes 62 are even in number, and even more preferably there are 2 or 4 holes. In the preferred embodiment illustrated in FIG. 4 the holes 62 are radial and arranged in diametrically opposite positions.

Figure 3:
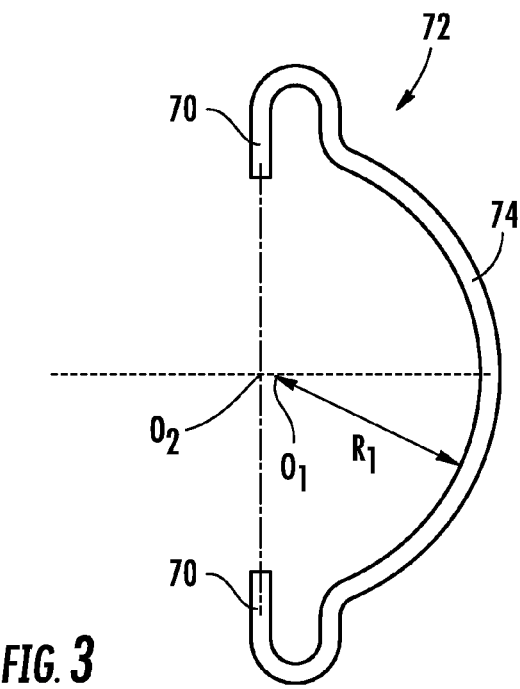
FIG. 3 is a plan view of a stop element used in the assembly of FIG. 1.
Figure 4:
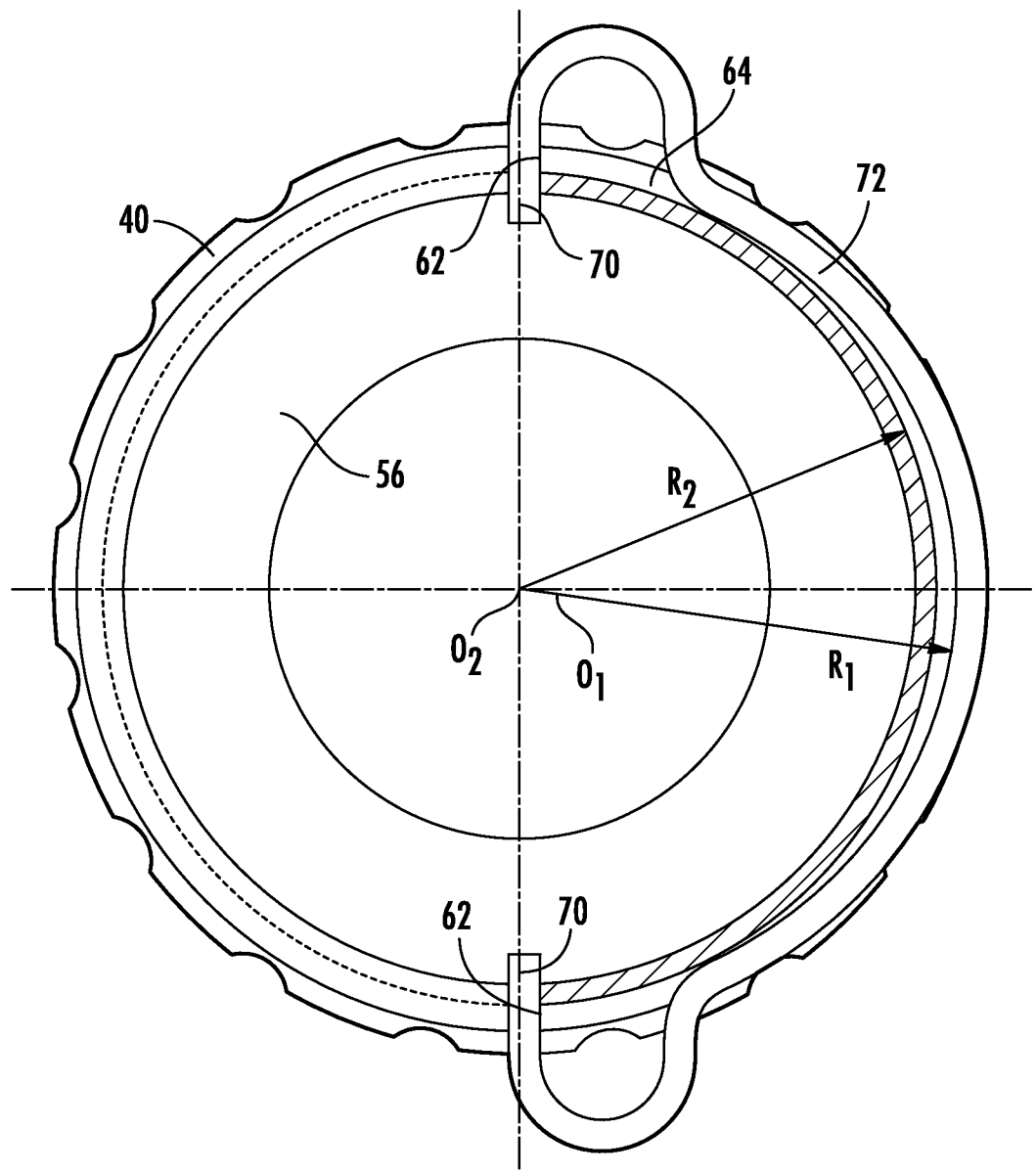
FIG. 4 is a front view partially in section of the right adapter device of FIG. 1.

Into the holes 62 are inserted the ends 70 of a second stop element (for example, a split pin 72 as illustrated in FIGS. 3 and 4) of the outer ring 58 configured to cooperate with the shoulder 56 to keep the bearing 15 inside a space having a predetermined axial extension.

As illustrated in FIG. 1, the second stop element 72 is thus removably associated with the main body 40 of the adapter device 30 at an axially outer annular end portion of said main body 40.

In particular, as illustrated in FIG. 4, the ends 70 of the second stop element, in assembled condition, project from the main body 40 of the adapter device 30 to block or limit the axial movement of the outer ring 58 of the bearing 15, so as to prevent it from slipping in the axial direction from the right adapter device 30 towards the outside of the assembly 1.

Preferably, the holes 62 are positioned at an axial distance C (FIGS. 1 and 2) from the bottom surface 56 that is greater than or equal to the axial extension of the outer ring 58 of the right bearing 15. This makes it easier to insert the end 70 of the split pin 72 in the holes 62, since sliding and banging against the outer ring 58 of the bearing 15 is prevented. Preferably, the difference between such a distance C and the axial extension B of the outer ring 58 is between 0 and 0.3 mm, even more preferably it is between 0.05 and 0.15 mm. Such a clearance allows the recovery of small sizing errors of the box 10.

Despite the clearance deriving from the slight difference indicated between C and B, the outer ring 58 of the right bearing 15 is considered substantially blocked in the adapter device 30 between the bottom surface 56 and the ends 70 of the split pin 72, in the sense that the possible relative axial movement between bearing 15 and main body 40 of the adapter device 30 is in any case limited at most to 0.3 mm, preferably to 0.15 mm.

The split pin 72 is preferably made with a shaped steel wire for springs and can for example have a circular central portion 74 having a radius R1 that is smaller than or equal to the radius R2 of the bottom of the throat 64 of the main body 40 of the adapter 30. In assembled condition the centre of curvature O1 of the split pin 72 and the centre of curvature O2 of the throat 64 (FIGS. 3 and 4) are offset. The ends 70 of the split pin 72 are formed by bending the edges of the circular portion towards the centre of curvature O1 of the circular central portion 74. Preferably the orientation of the ends 70 is not perfectly radial. In this way, and also thanks to the distance between O1 and O2, the split pin 72, when it is inserted into the main body 40 of the adapter device 30, elastically deforms, as illustrated in FIG. 4, and is retained in the throat 64.

The section of the split pin 72 can be of whatever type, for example circular or quadrangular.

In the example illustrated in FIG. 1 the left adapter device 35 differs from the right one 30 since the main body 40' thereof neither has the annular throat 64 nor the holes 62, and is not associated with any element to prevent or limit the axial translation of the outer ring 74 of the left bearing 20 towards the outside of the assembly 1. The shape of the main body 40' of the left adapter device 35, apart from the annular throat 64 and the holes 62, is identical to that of the main body 40 of the right adapter device 30.

Figure 5A:
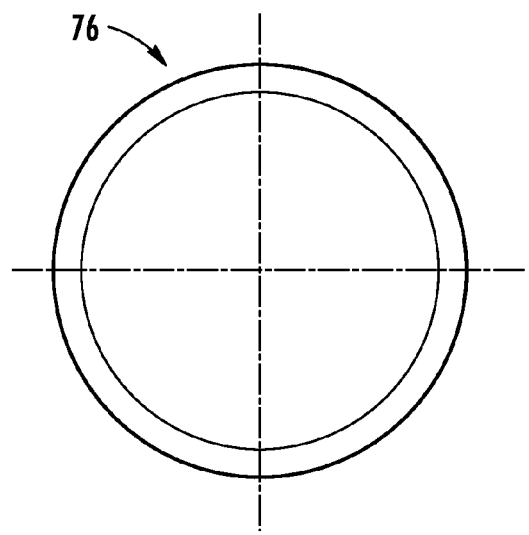
FIGS. 5a and 5b are respectively a front view and a side view of an elastic element used in the left adapter device of the assembly of FIG. 1.
Figure 5B:
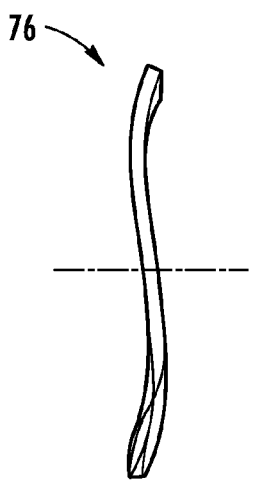

Between the outer ring 74 and the bottom surface 56' of the adapter body 40' an elastic element 76, for example a spring like the one illustrated in FIGS. 5a and 5b, is arranged in preloaded condition. Such a spring consists of a washer having an undulating lateral profile. The washer is designed so that, in a mounted configuration, it exerts a force of between 0 and 2.5 N on the bearing 20, depending upon the sizing error of the box that has been recovered, and preferably between 1 and 2 N.

The spring 76 has the task of allowing the bearing 20 to move with respect to the left adapter device 35 to recover the sizing errors of the box at the same time remaining preloaded.

The preloading of the spring 76 indeed allows a thrust to be exerted on the left bearing 20 not only in the case of movement towards the outside to recover excessive sizing of the box, but also in the case of movement towards the inside due to an error in defect of the size of the box 10.

The position of the spring 76 can be modified provided that it allows the recovery of the sizing errors of the box 10, for which reason it can for example be inserted between the shoulder 56 of the right adapter device 30 and the outer ring 58 of the right bearing 15, or between the ends 70 of the split pin 72 and the outer ring 58, or between the inner ring 26, 28 of any one of the bearings 15, 20 and a third stop element against which it abuts.

Figure 10:
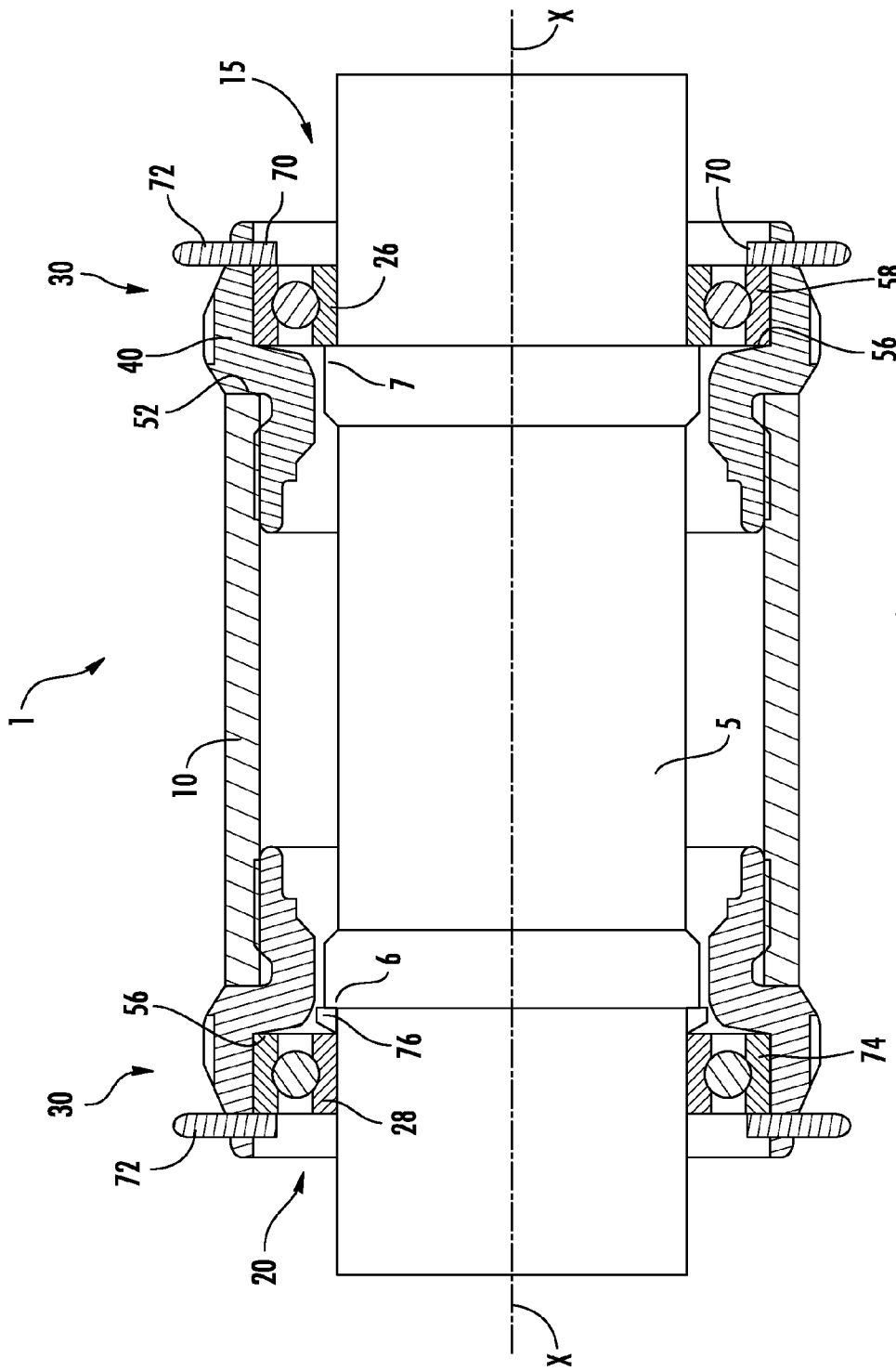
FIG. 10 is a schematic longitudinal sectional view of an alternative embodiment of a bicycle bottom bracket assembly in accordance with the present invention.

FIG. 10 shows an alternative embodiment of the bottom bracket assembly 1. In this FIG., elements that are the same as or corresponding to those of the assembly of FIG. 1 are indicated with the same reference numeral.

In the assembly 1 of FIG. 10, the sizing error of the box 10 is recovered allowing the inner ring of at least one of the two bearings to move with respect to the shaft. In particular, in the illustrated assembly 1, the shaft 5 has two shoulders 6 and 7 arranged on the inner side of the inner rings 26 and 28 of the right and left bearings 15 and 20. The spring 76 is arranged between the inner ring 28 of the left bearing 20 and the left shoulder 6.

The outer rings 58 and 74 of the bearings, on the other hand, are blocked in both axial directions by respective adapter devices 30 that are the same as the right adapter device 30 of the assembly of FIG. 1.

The embodiment of FIG. 10 allows the crank arms (not illustrated) to be brought closer to the bearings, subjecting the shaft to less bending stress. Moreover, due to the presence of the two adapter devices 30, the assembly is capable of absorbing axial overloading in both ways, given that it is shared out over both bearings.

In a further embodiment of the assembly 1 illustrated in FIG. 11, the sizing error of the box 10 is recovered allowing a ring of one of the two bearings to translate with respect to an adapter device, and axially blocking a ring of the other bearing with respect to the other adapter device.

In FIG. 11, elements that are the same as or corresponding to those of the assembly of FIGS. 1 and 10 are indicated with the same reference numeral.

In particular, the assembly 1 of FIG. 11 differs from the assembly 1 of FIG. 10 since the left adapter device 35 has an axial distance C'. between the bottom surface 56 and the ends 70 of the split pin 72 greater than the axial extension B of the outer ring 74 of the left bearing 20.

Springs 76 are arranged both between the bottom wall 56 and the outer ring 74 and between the outer ring 74 and the ends 70 of the split pin 72.

The right adapter device 30 is identical to the right adapter device 30 of FIG. 10 and of FIG. 1.

FIG. 12 shows a further alternative embodiment of the bottom bracket assembly 1. In this FIG., elements that are the same as or corresponding to those of the assembly of FIG. 1 are indicated with the same reference numeral.

The assembly 1 of FIG. 12 differs from the one of FIG. 1 in that it comprises a stop ring 90 (for example a Seeger ring) fitted onto a suitable annular seat 91 formed on the shaft 5 immediately to the left of the right bearing 15. Preferably, the ring 90 does not exert any pressure on the ring 26 of the bearing 15, providing a clearance of 0-0.2 mm. The advantage brought by the presence of the stop ring 90 is that of avoiding the inner ring 26 of the right bearing 15 from being able to slide on the shaft 5, making the assembly 1 unusable, in the case of very hard lateral knocks that thrust the shaft from left to right. The Seeger ring can thus be considered a third stop element for the right bearing.

FIG. 13 shows a further alternative embodiment of the bottom bracket assembly 1. In this FIG., elements that are the same as or corresponding to those of the assembly of FIG. 1 are indicated with the same reference numeral.

The assembly of FIG. 13 differs from that of FIG. 1 only in that the adapter devices, and consequently the bearings, are housed inside the box 10 through a right adapter device 300 and a left adapter device 350 screwed inside the box 10.

The right adapter device 300 comprises a main body 400 inside which a shoulder 560 is defined to prevent the axial translation of the bearing 15 towards the inside of the assembly 1. At one end portion of the main body 400 configured to remain outside the box 10 a split pin 72 identical to the one described with reference to FIGS. 1 to 4 is associated with the main body 400. The ends of the split pin 72 are configured to act on the outer ring 58 of the right bearing 15 through holes 62 formed on a free end portion of the main body 400, in a totally similar way to what has been described above.

The main body 400 also comprises an end flange 600 configured to abut against the front surface of a right end of the box 10.

Also in this case, the left adapter device 350 differs from the right one 300 since the main body 400' thereof does not have the holes 62, and is not associated with any element for preventing or limiting the axial translation of the outer ring 74 of the left bearing 20 towards the outside of the assembly 1.

The shape of the main body 400' of the left adapter device 350, apart from the holes 62, is identical to that of the main body 400 of the right adapter device 300. Also in this case, between the outer ring 74 and the bottom surface 56' of the adapter body 40' an elastic element 76 identical to the one described with reference to FIGS. 1, 5a and 5b is arranged in preloaded condition.

A person of ordinary skill in the art will note that the right adapter device 300 inside the box 10 of the assembly of FIG. 13 has in common with the adapter devices 30 and 35 of the assemblies of FIGS. 1, 10, 11 and 12 a shoulder 560, 56 arranged between the bearing 26 and the inside of the assembly, and a stop element 72 arranged between the bearing 26 and the outside of the assembly, the stop element being selectively removable and insertable from/into the holes 62 of the adapter device acting from outside of the assembly. For this reason, adapter devices that are the same as or similar to the adapter device 300 of FIG. 13 can be applied to the assemblies of FIGS. 1, 10, 11 and 12 to transform them into assemblies with bearings retained inside the box of the frame.

In each of the above illustrated examples, a fine realization of the box 10 would avoid the use of the spring 76.

Figure 6:
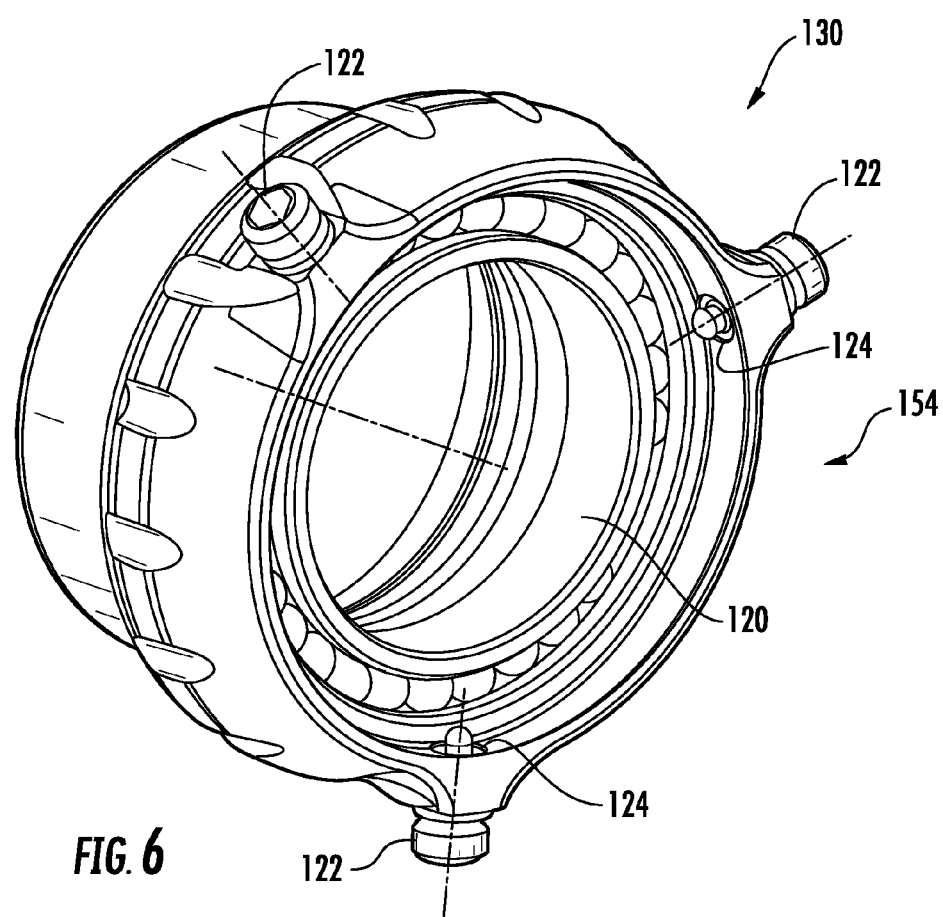
FIG. 6 is a perspective view of an alternative embodiment of an adapter device that can be used in the assembly of FIG. 1 in place of the adapter device of FIG. 4.
Figure 7:
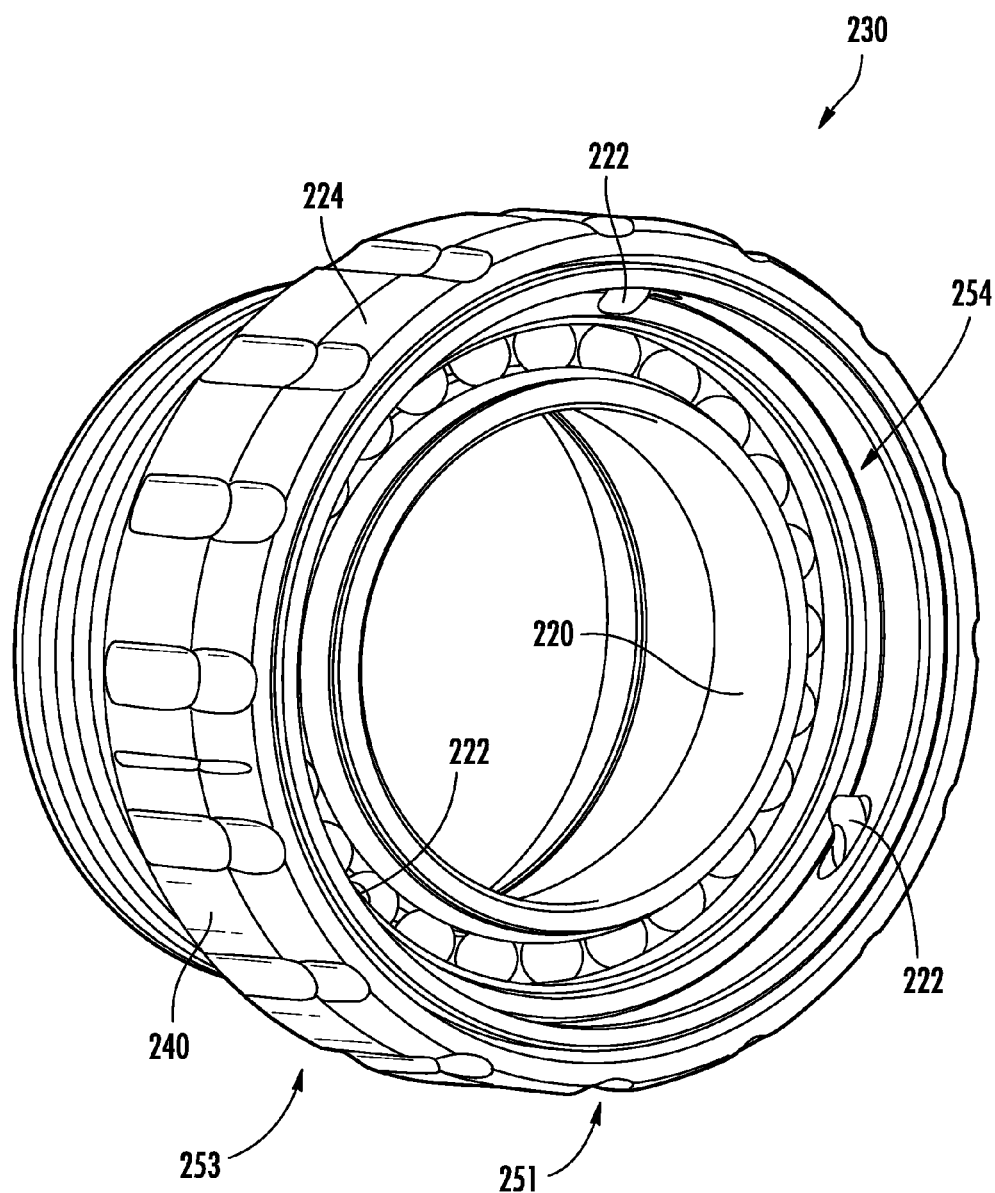
FIG. 7 is a perspective view of a further alternative embodiment of an adapter device that can be used in the assembly of FIG. 1 in place of the adapter device of FIG. 4.

FIG. 6 illustrates an adapter device 130 alternative to the one described and illustrated with reference to FIGS. 1 to 4. In such a device, a bearing 120 is substantially blocked in the seat 154 through radial screws 122. The screws 122 are inserted in radial threaded holes 124 so as to project inside the seat 154 exactly as stated for the ends 70 of the split pin 72 of FIG. 4. In an alternative embodiment that is not illustrated, the screws can press radially on the bearing so as to block it under pressure.

Figure 8A:
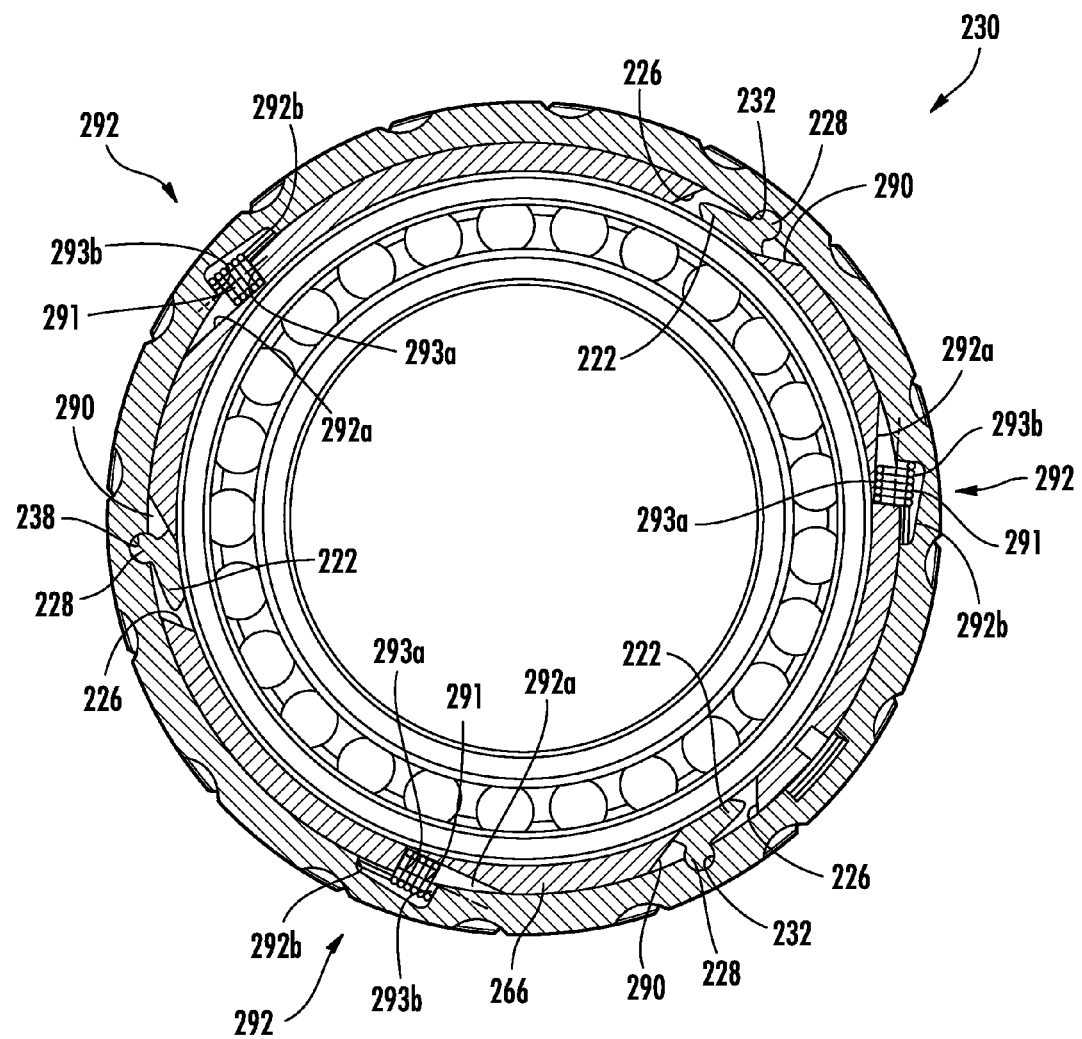
FIGS. 8a and 8b are respectively front sectional views of the adapter device of FIG. 7 in two different operative configurations.
Figure 8B:
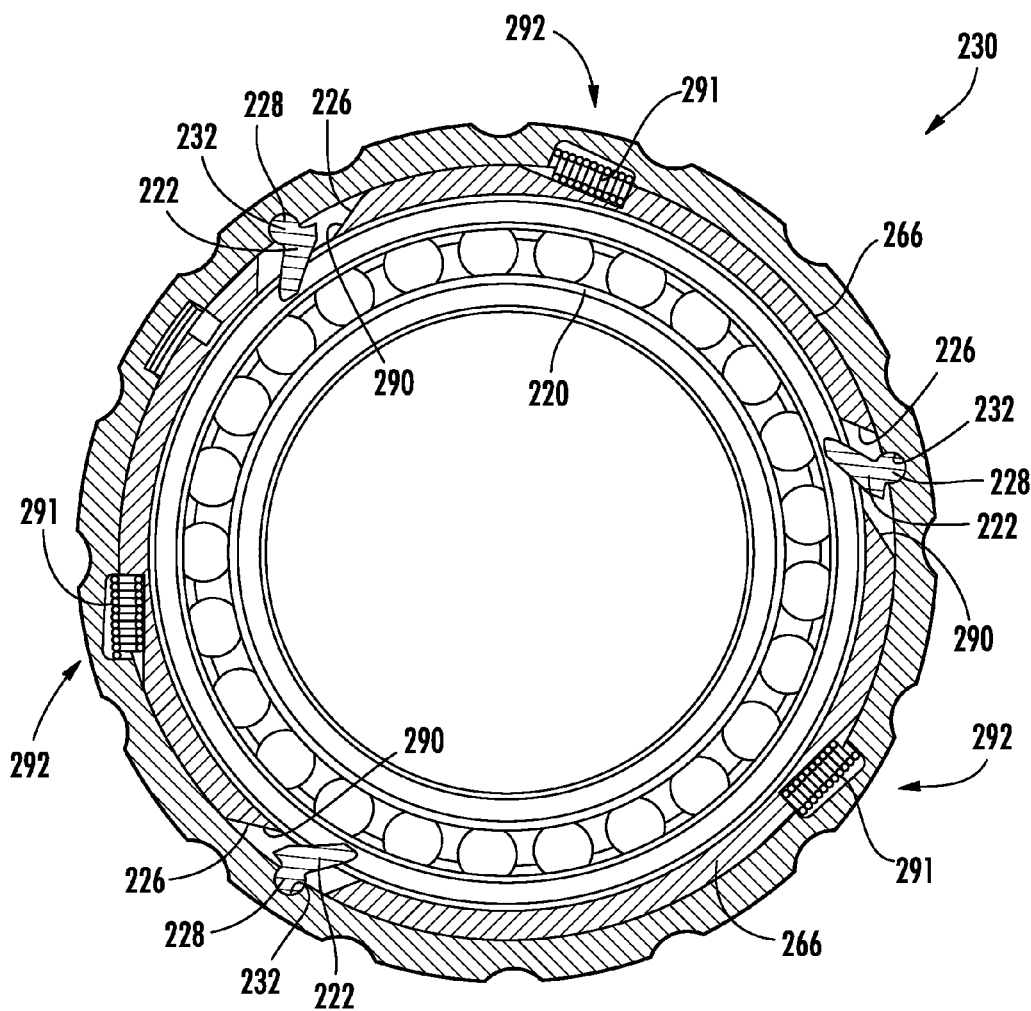

FIGS. 7, 8a, 8b and 9 illustrate a further alternative adapter device 230 in which a bearing 220 is substantially blocked in the seat 254 through pawls 222 selectively mobile from an engagement position, illustrated in FIG. 8b, to a disengagement position, illustrated in FIG. 8a, by acting on a control element 224.

Figure 9:
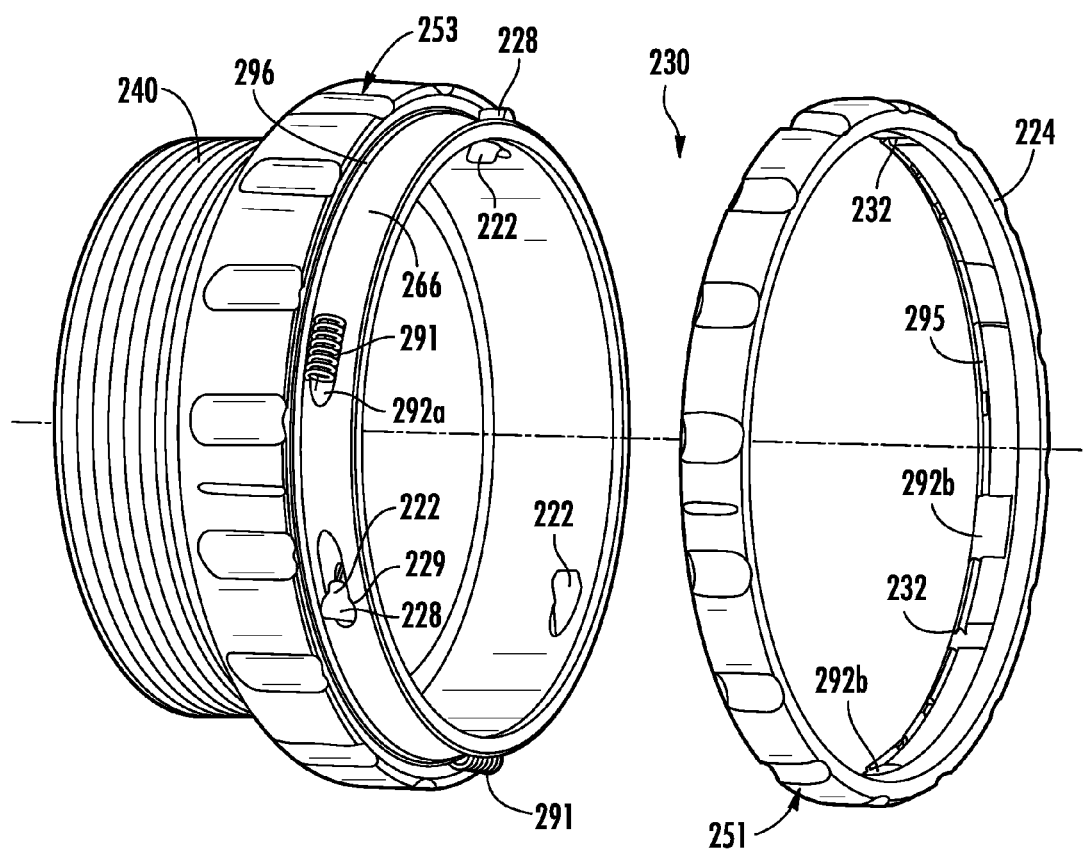
FIG. 9 is an exploded perspective view of the adapter device of FIG. 7.

The control element 224 comprises, in particular, a ring rotatably mounted on the cylindrical edge 266 of the main body 240 (FIG. 9).

The pawls 222 each comprise an elongated body housed in a respective opening 226 made passing through the cylindrical edge 266 of the main body 240 of the adapter device 230. Each pawl 222 has the control element 224 arranged on the top thereof. The heads 228 of each pawl 222 project from the openings 226 and are rotatably housed in suitable recesses 232 formed on the inner side of the control element. When the control element 224 is rotated from the position of FIG. 8b to the position of FIG. 8a, it brings the pawls 222 along with it until their heads 228 rotate in the recesses 232 through the thrust exerted by an inclined side surface 290 of the openings 226, and take up the disengagement position of FIG. 8a, in which a free end of each pawl does not project from the through opening 226 on the opposite side to the head 228 of the pawl 222. The thickness of the pawls 222 is such as to be able to completely house them in the openings 226. Similarly, the length of the pawls 222 is such that, when they take up the disengagement position of FIG. 8a, the body of the pawls is completely housed in the openings 226.

The inclined surfaces 290 extend along a non-radial direction for which reason they act as cam means with respect to the pawls 222.

The control element 224 is normally kept in the engagement position of FIG. 8b by compression springs 291 housed in seats 292, a first portion 292a of which being made in the cylindrical edge 266 and a second portion 292b of which being made in the control element 224 (FIG. 8a).

The first and second portions 292a and 292b of the seats 292 have thrusting surfaces 293a and 293b that are mobile towards and away from each other to compress the springs 291 in the passage from the position of FIG. 8b to that of FIG. 8a.

The heads 228 of the pawls 222 form an undercut 229 (FIG. 9) with respect to the cylindrical edge 266 of the main body 240 of the adapter device 230, so that the pawls cannot slip from the recesses 226 when the control element 224 is inserted.

The control element 224 is mounted so that it can rotate on the cylindrical edge 266 to which it remains fixedly connected thanks to an annular projection 295 snap-inserted into a corresponding annular throat 296 (FIG. 9).

The control element 224 can easily be installed since the portions 292b of the seats 292 and the recesses 232 are open on the side facing towards the main body 240 of the adapter device 230 (FIG. 9).

To actuate the control element 224 more easily, it has a grooved profile 251 on the outer surface thereof, this profile being configured to engage with a maneuvering key.

The main body 240 of the adapter device 230 also has a similar profile 253 (FIG. 9) at an outer surface of a body portion thereof adjacent to the control element 224. Such a grooved profile 253, in addition to make easier the screwing of the main body 240 into the box 10 of the frame, also allows a better grasping of such a main body 240 to keep it still during the actuation of the control element 224.

Preferably, the engagement profiles 251 and 253 are identical so that it is possible to use the same key both to screw the adapter device 230 into the box 10 and to actuate the control element 224.

What is claimed is:

1. Bicycle bottom bracket assembly, comprising:
   a shaft having a longitudinal axis X-X extending along a predetermined direction;
   a pair of bearings that rotatably support said shaft with respect to a housing box of a bottom bracket assembly in a bicycle frame, said box having an axial extent along said longitudinal axis X-X and opposite free ends;
   a pair of adapter devices associated with said opposite free ends of said box to support said bearings with respect to said box;
   at least one adapter device of said pair of adapter devices comprising at least one first stop element and at least one second stop element arranged on opposite sides with respect to at least one bearing of said pair of bearings,
   in which said at least one first stop element and at least one second stop element cooperate to keep said at least one bearing inside a space having a predetermined axial extension, and said at least one adapter device including a first portion having a first diameter arranged outside of said axial extent of said box, a second portion having a second diameter less than said first diameter arranged inside of said axial extent of said box, and said first portion has an aperture that receives a portion of said at least one second stop element, wherein said aperture comprises at least one through hole extending radially.

2. Assembly according to claim 1, wherein said space has an axial extension equal to the axial extension of said at least one bearing.

3. Assembly according to claim 1, wherein said space has an axial extension greater than the axial extension of said at least one bearing by a value of between 0 and 0.3 mm.

4. Assembly according to claim 1, wherein said at least one first stop element and at least one second stop element act on a first ring of said at least one bearing.

5. Assembly according to claim 4, wherein said first ring is an outer ring of said at least one bearing.

6. Assembly according to claim 1, wherein said at least one adapter device comprises a main body configured to be associated with one end of said box and wherein said at least one first stop element is defined by a shoulder made in a single piece with said main body and said at least one second stop element is associated with said main body at an axially outer free end portion thereof.

7. Assembly according to claim 6, wherein said at least one second stop element is removably associated with said main body.

8. Assembly according to claim 6, wherein said at least one second stop element is configured to be connected with said main body and is selectively mobile between a disengagement position in which said at least one second stop element does not project from said main body and an engagement position in which said at least one second stop element at least partially projects from said main body.

9. Assembly according to claim 8, comprising a control element selectively mobile between a first operative position in which said at least one second stop element is in said disengagement position and a second operative position in which said at least one second stop element is in said engagement position.

10. Assembly according to claim 9, wherein said control element comprises a ring rotatably mounted on said axially outer annular end portion of said main body.

11. Assembly according to claim 10, comprising elastic means acting between said ring and said annular end portion of said main body to thrust said at least one second stop element to said engagement position.

12. Assembly according to claim 11, wherein said elastic means comprise at least one compression spring acting between a first thrusting surface defined in a first seat formed in said inner surface of said ring and a second thrusting surface defined in a second seat formed on an outer surface of said annular end portion of said main body.

13. Assembly according to claim 9, wherein said control element comprises an outer surface having a grooved profile.

14. Assembly according to claim 13, wherein said main body comprises an axially inner body portion adjacent to said axially outer annular end portion and having an outer surface having a grooved profile identical to the grooved profile of said control element.

15. Assembly according to claim 1, wherein said at least one through hole is at an axial distance from said at least one first stop element greater than the axial extension of said at least one bearing by a value of between 0 and 0.3 mm.

16. Assembly according to claim 1, wherein said at least one through hole is formed in an annular throat made on an outer surface of said annular body portion of said main body.

17. Assembly according to claim 16, wherein said at least one second stop element is housed in said at least one annular throat and comprises at least one end portion projecting from said at least one through hole.

18. Assembly according to claim 17, wherein said at least one second stop element is made from an elastic material and comprises a substantially circular central body portion having a bending radius that is smaller than or equal to the bending radius of said annular throat.

19. Assembly according to claim 1, comprising a plurality of through holes.

20. Assembly according to claim 19, wherein said through holes are even in number.

21. Assembly according to claim 20, wherein said radial through holes are arranged in radially opposite positions.

22. Assembly according to claim 1, wherein said at least one through hole is a threaded hole and said at least one second stop element comprises at least one screw housed in said at least one threaded hole and having a free end projecting from said at least one threaded hole.

23. Assembly according to claim 1, wherein the other bearing of said pair of bearings is left free to move with respect to at least one from the adapter device and said shaft in at least one way of said predetermined direction.

24. Assembly according to claim 23, wherein said bearing is left free to move in both ways of said predetermined direction.

25. Assembly according to claim 23, wherein at least one from said adapter device and said shaft comprises at least one shoulder and a preloaded elastic element is arranged between said bearing and said at least one shoulder.

26. Assembly according to claim 25, wherein said at least one shoulder is defined in a first adapter device and the other adapter device comprises said at least one first stop element and at least one second stop element.

27. Assembly according to claim 25, wherein said at least one shoulder is defined in said shaft and both of the adapter devices comprise said at least one first stop element and at least one second stop element.

28. Assembly according to claim 25, wherein both of the adapter devices comprise said at least one first stop element and at least one second stop element and wherein a preloaded elastic element is arranged between said at least one first stop element and at least one second stop element of at least one adapter device.

29. Assembly according to claim 25, wherein said elastic element comprises a washer having an undulating lateral profile.

30. Assembly according to claim 1, further comprising a third stop element firmly connected to said shaft on the opposite side to said at least one second stop element with respect to said at least one bearing.

31. Assembly according to claim 30, wherein said third stop element is a ring inserted in a throat made on said shaft.

32. Assembly according to claim 1, wherein said adapter devices are configured to be associated cantilevered with the opposite ends of said box to support said bearings outside of said box.

33. Adapter device for supporting a bearing of a bottom bracket assembly with respect to a housing box of such an assembly provided in a bicycle frame, comprising:
   a main body including an annular surface that abuts against a free axial end of said box and an aperture positioned axially outwardly of the annular surface, and said aperture comprises at least one through hole extending radially;
   at least one first stop element; and
   at least one second stop element facing the first stop element and arranged at a predetermined distance from the first stop element, a portion of the at least one second stop element being received in the aperture;

wherein the at least one first and second stop elements define a range of motion of a bearing along a longitudinal axis of the housing box.

34. Device according to claim 33, wherein said at least one first stop element is defined by a shoulder made in a single piece with said main body and said at least one second stop element is defined by at least one second stop element associated with said main body at an axially outer free end portion thereof.

35. Device according to claim 34, wherein said at least one second stop element is removably associated with said main body.

36. Device according to claim 34, wherein said at least one second stop element is configured to be connected with said main body and is selectively mobile between a disengagement position in which said at least one second stop element does not project from said main body and an engagement position in which said at least one second stop element at least partially projects from said main body.

37. Device according to claim 33, further comprising an elastic element coupled with said at least one first stop element or with said at least one second stop element and configured to be arranged between said at least one first stop element or said at least one second stop element and said bearing.

38. Method for mounting a bearing of a bottom bracket assembly with respect to a housing box of such an assembly provided in a bicycle frame, comprising the steps of:
providing an adapter device comprising a main body having an annular surface, an aperture positioned axially outwardly of said annular surface wherein said aperture comprises at least one through hole extending radially, at least one first stop element and at least one second stop element facing each other and arranged at a predetermined distance from each other, a portion of said at least one second stop element being received in said aperture;
associating said main body with a free axial end of said box such that said annular surface of said main body abuts against said free axial end.

39. A bicycle bottom bracket assembly, comprising:
a shaft having a longitudinal axis;
a pair of bearings that rotatably support said shaft with respect to a housing box of a bottom bracket assembly in a bicycle frame;
a pair of adapter devices associated with opposite free ends of said box to support said bearings;
at least one adapter device of said pair of adapter devices comprising at least one first stop element positioned axially between at least one second stop element and an annular surface that abuts against an axial end of said box, a portion of said at least one second stop element being received in an aperture formed on said at least one adapter device axially outwardly of said annular surface, in which said at least one first stop element and at least one second stop element define a range of movement of said bearing along said longitudinal axis, wherein said aperture comprises at least one through hole extending radially.

40. A bicycle bottom bracket assembly, comprising:
a shaft having a longitudinal axis;
a pair of bearings that rotatably support said shaft with respect to a housing box of a bottom bracket assembly in a bicycle frame, said box having an axial extent along said longitudinal axis and opposite free ends;
a pair of adapter devices associated with said opposite free ends of said box to support said bearings;
at least one adapter device of said pair of adapter devices comprising at least one first stop element and at least one second stop element arranged on opposite sides of one of said bearings and define a range of movement of said bearing along said longitudinal axis;
said at least one adapter device comprising a main body configured to be associated with one end of said box and wherein said at least one first stop element is defined by a shoulder made in a single piece with said main body and said at least one second stop element is associated with said main body at an axially outer free end portion thereof, and said at least one adapter device including a first portion having a first diameter arranged outside of said axial extent of said box, a second portion having a second diameter less than said first diameter arranged inside of said axial extent of said box, and said first portion having an aperture that receives a portion of said at least one second stop element; and,
wherein said aperture formed on said first portion of said at least one adapter device comprises at least one through hole extending radially.

41. Assembly according to claim 40, wherein said at least one second stop element is removably associated with said main body.

42. Assembly according to claim 40,
wherein said at least one through hole is formed in an annular throat made on an outer surface of said annular body portion of said main body;
said at least one second stop element is housed in said at least one annular throat and comprises at least one end portion projecting from said at least one through hole; and
said at least one second stop element is made from an elastic material and comprises a substantially circular central body portion having a bending radius that is smaller than or equal to the bending radius of said annular throat.

43. Assembly according to claim 40, wherein said adapter devices are configured to be associated cantilevered with the opposite ends of said box to support said bearings outside of said box.

44. An adapter device for supporting a bearing of a bicycle bottom bracket assembly with respect to a housing box of such an assembly comprising:
a main body including an annular surface that abuts against a free axial end of said box;
at least one first stop element;
and at least one second stop element that is arranged on an opposite side of the bearing from said at least one first stop element and has a portion that extends through an aperture formed in the adapter device axially outwardly of said annular surface, and cooperates with said at least one first stop element to limit the movement of the bearing, said at least one first stop element being positioned axially between said annular surface and said at least one second stop element, wherein said aperture comprises at least one through hole extending radially.

45. Bicycle bottom bracket assembly, comprising:
a shaft having a longitudinal axis X-X extending along a predetermined direction;
a pair of bearings that rotatably support said shaft with respect to a housing box of a bottom bracket assembly in a bicycle frame, said box having an axial extent along said longitudinal axis X-X and opposite free ends;
a pair of adapter devices associated with said opposite free ends of said box to support said bearings with respect to said box, each one of said pair of adapter devices having a first portion having a first diameter arranged outside of said axial extent of said box, and a second portion having a second diameter less than said first diameter arranged inside of said axial extent of said box;

at least one adapter device of said pair of adapter devices comprising at least one first stop element and at least one second stop element arranged on opposite sides with respect to at least one bearing of said pair of bearings, a portion of said second stop element being received in an aperture formed on said first portion, in which said at least one first stop element and at least one second stop element cooperate to keep said at least one bearing inside a space having a predetermined axial extension, and the other bearing of said pair of bearings is left free to move with respect to at least one from the adapter device and said shaft in at least one way of said predetermined direction, wherein said aperture comprises at least one through hole extending radially.

* * * * *